June 22, 1965  H. M. SWEET  3,189,969
CENTERING OF BOLTS FOR COUPLING HOUSINGS
Filed June 19, 1962  2 Sheets-Sheet 1
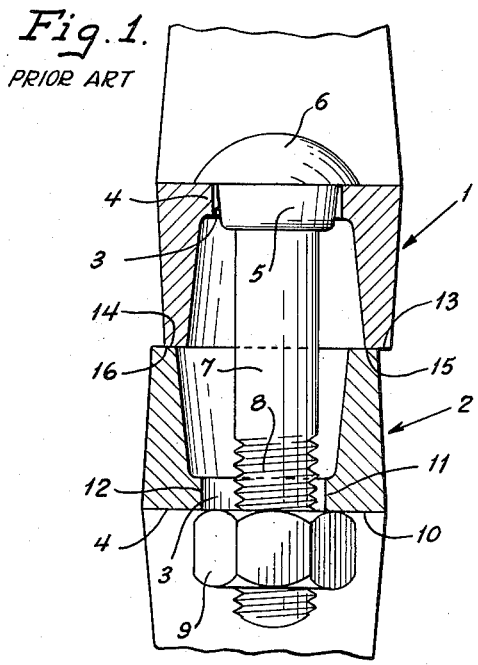
Fig. 1. PRIOR ART
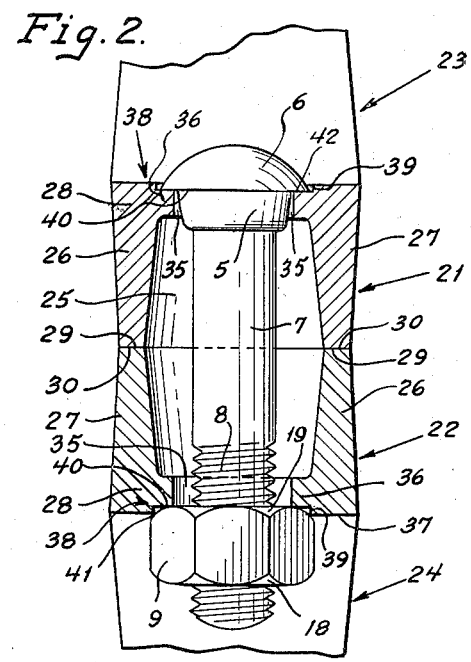
Fig. 2.
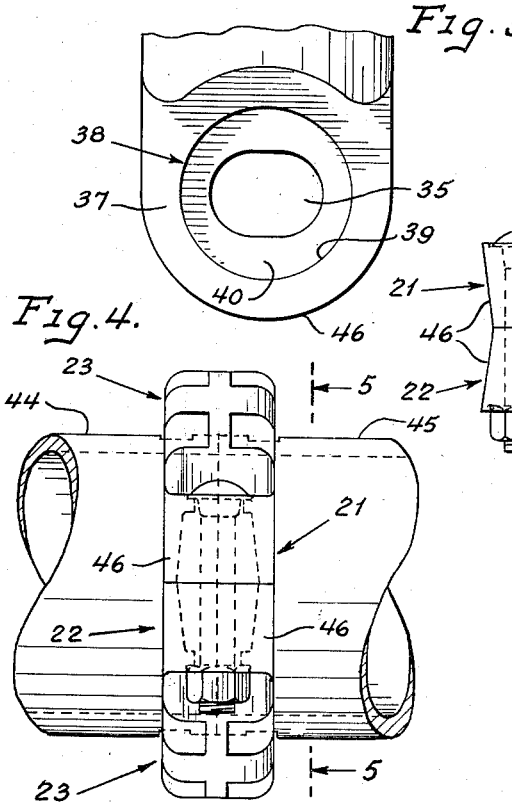
Fig. 3.
Fig. 4.
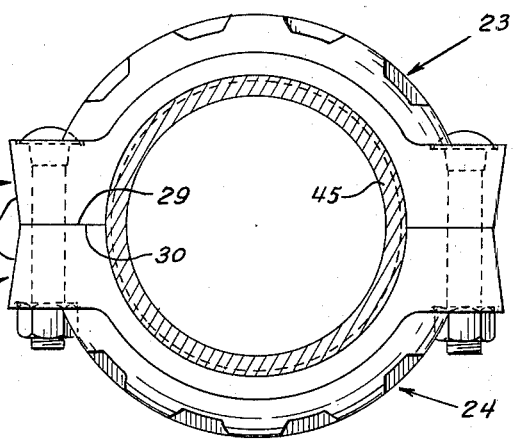
Fig. 5.
INVENTOR.
HARRY M. SWEET
BY
ATTORNEY.

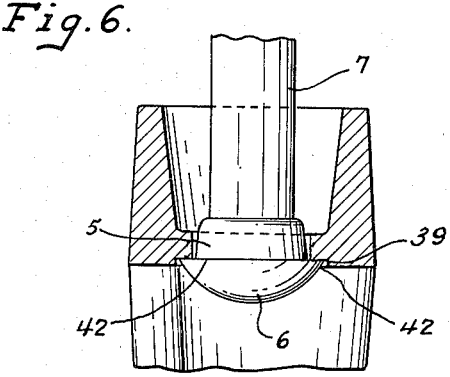
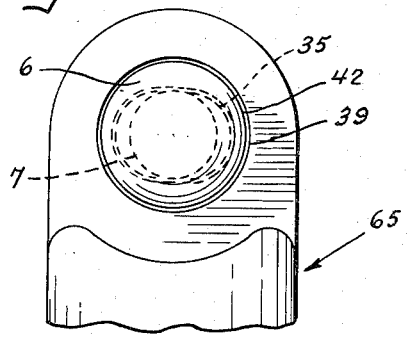
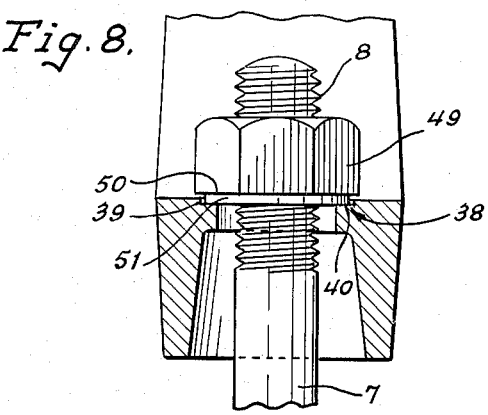
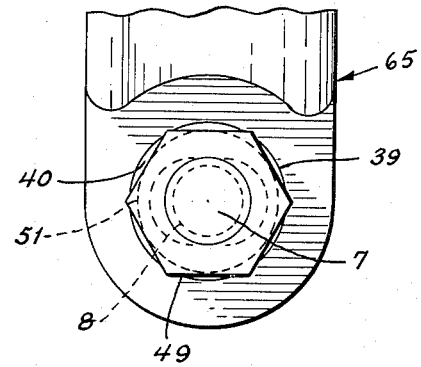
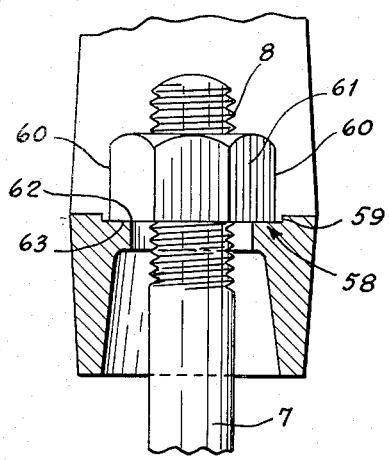
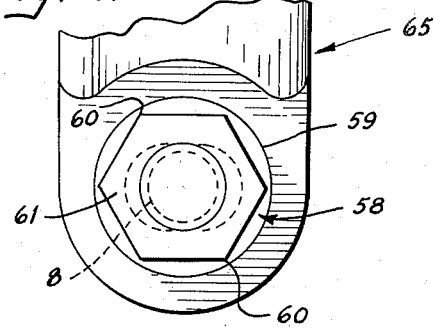
INVENTOR.
HARRY M. SWEET
BY
ATTORNEY.

3,189,969
**CENTERING OF BOLTS FOR COUPLING
HOUSINGS**
Harry M. Sweet, East Hanover Township, Morris County,
N.J., assignor to Victaulic Company of America, Union,
N.J., a corporation of New Jersey
Filed June 19, 1962, Ser. No. 293,491
4 Claims. (Cl. 24—279)

This invention relates to clamp type coupling housings for pipe coupling and is particularly concerned with the centering of the bolts used in clamping the housing sections together about the sections of pipe to be coupled.

One common form of clamp type couplings employs a cylindrical housing made up of segments, which segments are clamped together by means of bolts to complete the cylinder. Illustrations of such type of coupling in the prior art are found in the Tribe Patent 1,541,601, June 9, 1925, where grooves are formed in the pipe for engagement by key sections of the coupling housing, which housings bridge the ends of the pipes and in the patents to Krooss, 2,439,979, of April 20, 1948, and to Frost et al., 3,024,046, of March 6, 1962, wherein various toothed elements carried by the coupling housings bite into the pipes to secure them without the utilization of any preformed grooves.

The bolts used for securing the housing segments of the foregoing couplings together, as well as those used for securing together the segments of a variety of other coupling housings available on the market, are what are known as "track bolts." These bolts have rounded domed heads but the portions of the shanks immediately beneath the heads, hereinafter referred to as "the oval necks" are transversely elliptical so that when engaged with a mating elliptical, or oval, hole the bolts will be prevented from turning as the clamping nuts on the other ends of them are tightened.

For receiving the track bolts the housing segments commonly have what are referred to in the trade as "bolt pads" extending radially outwardly from the outer surfaces of the segments at the ends thereof. The bolts are passed through holes in such pads for securing the segments together and inasmuch as the segments for each type of coupling housing of the same size are normally identical and interchangeable, the bolt holes in the bolt pads must all be the same. More importantly, the holes must all be elliptically formed for mated reception of the oval necks, for when the segments are supplied there is no way of knowing which pad will receive the head of the bolt and which one will have the normal circular cross section shank of the bolt extended therethrough in order to receive the clamping nut on the outer surface of the pad. Thus all bolt pads for the same type and size of coupling have the same size elliptical bolt hole therein.

To facilitate the assembly of bolts and pads the oval holes are somewhat larger than the oval bolt necks. Thus the workmen have no difficulty in seating the bolts in place. However this subsequently allows for considerable swinging movement of the bolts about their heads.

Another important consideration is that the elliptical bolt holes have their major axes oriented transversely with respect to the coupling. This is important for it enables the bolt holes to be kept in as close as possible to the outer surface of the coupling housings. This provides the best clamping effect, insures that the joints have the greatest possible strength and prevents the segments from getting out of round adjacent therein. A joint considerably weaker in these respects would result if the major axes of the ellipses were oriented radially of the coupling housings rather than transversely thereof.

With the refinements in clamp type couplings that have been introduced from time to time, it has become increasingly evident that the provision of the transverse elliptical holes in the bolt pads, while necessary to prevent the bolts from turning, retains an undesirable factor in the assembly. This results from the fact that the circular shank of the bolt, not being elliptically enlarged as is the oval neck, is able to move transversely to a considerable extent in the elliptical hole provided in the bolt pad. Hence one of the bolt pads, and the coupling housing segment carrying it, is similarly able to move transversely with respect to the adjacent segment and pad therefor. This results most undesirably in the segments getting out of alignment with each other. How really damaging this is to the effective coupling of pipe ends can be readily appreciated when it is understood that where the coupling housings engage grooves in the pipe exteriors those grooves are formed an exact standard distance back from the pipe ends.

However, the grooves are normally wider than the key sections by a considerable amount to allow for expansion and contraction of the pipes. As a non limiting example, a groove $5/16''$ wide as used in a pipe of $3''$ diameter or less would have a key section only $3/16''$ wide on the coupling housing employed. Hence the segments can get out of alignment to a considerable extent even when key sections are seated in grooves. This misalignment is often generated in the tightening of the nuts against the pads since the nuts tend to travel like a wheel as they are turned for tightening. Not only does this create misalignment but it tightens one side of the coupling housing more than the other with consequent variation in holding power. Also it causes the pipe ends to be misaligned. When the coupling housings carry teeth, or other elements, for locating the housing with respect to the pipes and securing the pipe ends together, the teeth should be caused to bite into the pipe at a set distance from the end thereof and, if a proper strong joint is to be made, all the teeth of the various segments engaging each of the pipe sections should lie in the same circumferential path around the pipe. It is also appreciated, of course, that besides the tight gripping of the pipes by the housing segments, for the making of a leakproof pressure tight joint, the proper positioning of the gasket within them overlying the pipe ends is a most important factor.

Though the problem outlined in the foregoing has been recognized for some time and has been increasing in seriousness with improvements in coupling housings and manners of engaging the same with the pipes, no one has heretofore been able to devise a satisfactory simple economical way of overcoming it. The solution has awaited the advent of the instant invention which completely solves the problem in a straightforward and effective manner.

The solution of the invention resides in superimposing circular recesses over the elliptical holes with the center of the circle lying at the crossing point of the major and minor axes of the ellipse. These recesses extend only a short distance into the metal of the bolt pads from the outer surface thereof, a distance which is sufficient for centering the nuts, and hence the shanks of the bolts passing through the nuts, with respect to the center line of the circular opening. The centering effect increases as the nut is tightened.

Though the oval bolt neck is centered to a certain extent by the oval hole receiving it there is enough freedom for sidewise movement of the neck in the hole that more exact centering is desirable. Accordingly, improved results are also obtained by centering the domed head of the bolt in a recess. Furthermore for interchangeability of housing segments it is necessary that the same recesses be provided in all of them. Hence, with the bolt head centered in its recess with its bottom surface bottomed on the base of that recess and the nut centered in the recess of the other bolt pad, the segments can be accurately and tightly clamped together. The recesses extend outwardly to overlie the side walls of the bolt pads beyond the position where the webs surrounding the bolt holes extend from those side walls, so little strength is lost by the thinning of the webs through which the bolt holes extend a a result of forming the recesses. Accordingly, the recessing of the bolt pads in accordance with the invention solves the prior art problem of the segments getting out of alignment and eliminates the dilatorious results from such misalignment. At the same time, the invention expedites the tightening of the bolts in drawing the segments together, for the nuts are held on center all around and have none of the awkwardness of tightening nor the "wheeling" and one sided binding effect which results from their travelling off center.

It is, accordingly, the principal object of the invention to improve upon the drawing together of bolted segments of clamp type couplings.

Another object is to assure the alignment of the segments of clamp type couplings as they are being bolted together.

Another object is to prevent sidewise "wheeling" of the nuts employed for drawing together such segments.

Still another object is to effect the foregoing objects without complicating the construction of bolted clamp type couplings.

A further object is to improve upon the clamping action of bolted clamp type couplings while retaining all the existing advantages thereof.

A further object is to prevent uneven clamping action on the pipes being coupled by clamp type couplings.

Still another object is to effect the foregoing and other objects by means of a minor modification in the clamp structure having little effect on the manufacturing costs.

Further and more detailed objects of the invention will in part be obvious and in part be pointed out as the description of the invention taken in conjunction with the accompanying drawing proceeds.

In that drawing:

FIG. 1 is a fragmentary sectional view of a pair of coupling segments illustrating the misalignment which occurs between the segments of coupling housings in accordance with the prior art.

FIG. 2 is a similar view illustrating the manner in which the preferred form of the invention overcomes the prior art deficiency.

FIG. 3 is a fragmentary top plan view of a bolt pad in accordance with the invention showing the surrounding of the elliptical bolt hole by the centering recess.

FIG. 4 is a front elevational view of a pipe joint employing coupling housing segments in accordance with the invention.

FIG. 5 is an end elevation thereof as viewed from line 5—5 in FIG. 4.

FIG. 6 is a fragmentary sectional view of the upper bolt pad of FIG. 2 showing the same in reverse position with the bolt extending upwardly from its head.

FIG. 7 is a bottom plan view of the bolt pad and bolt as seen in FIG. 6.

FIG. 8 is a fragmentary sectional view of a bolt pad and bolt in accordance with the invention, showing the use of a modified form of nut.

FIG. 9 is a top plan view thereof.

FIG. 10 is a view similar to FIG. 8, showing a further modification of nut; and

FIG. 11 is a top plan view of FIG. 10.

Considering briefly the prior art showing in FIG. 1, it is to be appreciated that both bolt pads 1 and 2 are identical, though faced in reverse directions. Thus the holes 3 through their webs 4 have the same elliptical or oval configuration in each instance, which oval has its longer dimension extending transversely of the bolt pads, or crosswise of the sheet as the structure is here depicted. The enlarged neck 5 lying below the spherically formed head 6 of the bolt 7 has an oval formation complementary to that of the hole 3 and though it fits that hole rather freely their relationship prevents turning of the bolt as the nut is tightened, and generally centers the bolt head with respect to its pad. At the opposite bolt pad 2, however, the condition is quite different. Here the circular shank 7 of the bolt, which passes through the elliptical opening 3 so that the threaded portion 8 thereof may receive the nut 9 for clamping engagement with the surface 10 of the bolt pad, is of sufficiently smaller diameter than the longer dimension of the hole 3, as well as being smaller than the shorter dimension thereof, that it can move readily from one end 11 to the other end 12 of that hole. When there is any tendency of one of the housing segments to go out of alignment with respect to the next one, that tendency increases as the nut it tightened, and the segments slide sidewise with respect to each other. Another factor which makes for misalignment is the tendency of the nut to "wheel" along the pad surface as it is turned for tightening. This is particularly pronounced when the side of the nut towards one end of the hole engages the pad surface more strongly than the other one.

The misalignment of the end face engaging surfaces 13 and 14 of the bolt pad 1 with respect to the supposedly mated surfaces 15 and 16 of the bolt pad 2 is indicative of various bad conditions. For effective and accurate clamping effect the surfaces 13 and 15 and 14 and 16 should fully and accurately overlie each other in the pairings just mentioned. If they do not, the clamping effect produced by the bolts 7 and its nut 9 is minimized and unbalanced, the housing segments themselves will be as much out of line as is indicated by the misalignment of surfaces 13 and 15 and 14 and 16, the joint will be weakened and the gasket will not be properly housed. Instead, the gasket will be given a jog, or be pinched, where the misaligned segments come together for the gasket channel will include the same alignment. Hence the joint, if tight at all, will not withstand the pressure and service abuse to anything like the extent of a properly aligned joint. The invention, however, prevents this misalignment along with the results of it as first seen in the FIG. 2 preferred form.

In the FIG. 2 form the same nut and bolt are employed as shown in FIG. 1, so the parts thereof will be given the same reference characters, and need not be again described. One aspect that has not been pointed out, however, is that the nut 9, as also seen in the FIG. 1 form, is a common hex nut of the double chamfered type. That is, it is chamfered at both top and bottom as seen at 18 and 19. The chamfer takes off the end portions of the protruding corners of the nut at its opposite faces so presents rounded end surfaces. This chamfering is taken full advantage of in the invention, as will appear.

The bolt pads 21 and 22, as seen in FIGS. 2, 4 and 5, extend out from the ends of their respective housing segments 23 and 24, are hollow internally as seen at 25, and have tapered side walls 26 and 27 joined at their thicker ends by transverse portions 28. In one position a portion 28 is a bottom transverse portion while in the other it is a top one. They have the same structure no matter where positioned and they both have end faces 29 and 30 which lie on the radius defining the end of the segments. Thus when the coupling housing is made up of two segments, as here illustrated, and those segments are properly aligned and clamped together, the pairs of end surfaces 29, 30 come into engagement and exactly overlie each other. This is the condition to be desired and it is a condition assured by the invention. The same exact alignment is, of course, desired where the housings are made up of more than two segments which occurs as the housings increase in size.

As already pointed out, the bolt holes 35 (see particularly FIG. 3), which extend through the webs 36 at the ends of the bolt pads opposite the surfaces 29, 30, are elliptical or oval with their longer dimension extending transversely of the coupling housings. Likewise, the oval bolt necks 5 carried by the bolt 7 are generally, but rather loosely mated to the bolt holes 35. Commonly the housing segments are castings, and it is necessary that the bolt 7 can be easily and quickly dropped into place in the bolt holes, hence the holes 35 are cast sufficiently big enough for this purpose. If the bolt holes are subjected to a finishing operation, the holes become even larger. Thus though the shape relationship of the bolt holes 35 and bolt necks prevents turning of the bolts as the nuts are turned up, there is nevertheless a fair amount of play between the bolt necks 5 and their bolt holes 35. This is by no means sufficient to enable misalignment at this end to anything like the extent seen at the nut end in the prior art showing of FIG. 1. Nevertheless it is a subsidiary feature of the invention to also prevent even the small misalignment that might result at the head end of the bolt. This prevention is effected by the same means that prevents the much greater misalignment which could otherwise take place at the nut end of the bolt.

The feature of the invention which prevents bolt misalignment is the recessing of the web 36 from its outer surface 37 inwardly into a circular formation 38, best seen per se in FIG. 3. This circular recess is centered with respect to the center of the oval hole 35 and it is of a size to receive the somewhat rounded end 19 of the nut 9 to a sufficient extent to assure that as the nut is tightened, the nut and the bolt extending through it will remain in the desired center position on the bolt pad. At the same time, as best seen in FIG. 2, the size of the recess 38 is such that it more closely approaches the periphery of the bolt head 6 than is true of the bolt hole at 35 and the head collar 5.

Reverting to the manner in which the nut 9 engages the recess 38, it is seen that the periphery 39 of the recess does not extend out far enough to embrace the corners 41 of the nut. There is no need that it do so for the rounding 19 imparted to the end of the nut causes the nut to constantly ride into the recess. At the same time the recess is shallow enough for the flat end of the nut to make substantial contact with the recess bottom 40. As the nut is tightened then, it will, due to the inward riding tendency of its rounded portions 19 on the outer edge of the recess side wall 39 tend more and more to center itself within the recess. At the same time, of course, this will center the bolt 7 passing through the nut 9.

Reverting again to the bolt head 6, it will be seen that its periphery 42 lies within the side wall 39 of the recess 38 so the head end as well as the nut end of the bolt will be effectively centered on the bolt pad. Besides being centered with respect to the bolt pad, the center of the recess 38 conforming as it does with the center of the opening 35, lies in the radial plane passing through the center of the coupling housing.

FIG. 4 shows the condition of an exact alignment of coupling housing segments which exists in the joining together of two pipe ends 44 and 45 clamped together using housing segments embodying the centering feature of the invention. From this showing as well as from the showing in FIGS. 3 and 5, it will be seen that the outer ends of the bolt pads are rounded off by a continuation of the side walls 26 and 27, thereby enclosing the hollow 25 within the pads.

FIG. 6 shows the bolt head in the same manner as does FIG. 2, except in upside down position which however is a more common position adopted in the field inasmuch as it is easier for the workman to tighten down the nuts from above than to tighten them up from underneath.

FIG. 7 being a bottom plan view of FIG. 6 enables the showing of the relative positions of the recessed periphery, the periphery of the bolt head, the oval bolt hole, and the circular bolt shank. This showing emphasizes the fine alignment achieved by the invention.

FIGS. 8 and 9 shows modifications of the invention wherein a special washer faced nut is employed in place of the common double chamfered nut of the preferred form. Otherwise, all the features of the construction are the same as those of the preferred form so carry the same reference characters. Here the hex nut 29 has one end 50 lying in a flat plane at right angles to the nut and has an extension 51 in the form of a circular washer a little deeper than the recess 38 extending from the side wall toward that recess. Furthermore, the periphery of the washer 51 is a little smaller than the periphery 39 of the recess 38. This difference is sufficient to enable the nut to be easily seated with the washer portion 51 in the recess 38 while the space between the periphery 51 and the side 39 of the recess is not sufficient to enable any misalignment of the bolt 7 of any consequence.

The washer 51 can of course be formed as a part of the integral nut 49, it can be made as a separate member secured to the nut as by welding, or it could be a separate washer slipped over the screw threaded part 8 of the bolt. However, a washer member secured to the nut, whether as an integral extension or otherwise, and preferably internally including a continuation of the threads of the nut is to be preferred. As previously pointed out, the bolt head and the recess receiving the same would be the same here as in the preferred form.

The further modification of the invention shown in FIGS. 10 and 11 calls for a recess 58, a little larger in diameter than the recess 38 of the previous forms. This is so in order to enable the periphery 59 of the recess to receive within it the full width across the corners 60 of the hex nut 61. This nut has a flat face 62 which seats down on the base 63 of the recess 58.

In this form, as seen from the FIG. 11 showing, centering of the nut 61 within the periphery 59 of the recess is most effectively achieved by the six corners 60 of the nut lying within and close to the recess periphery 59. Here most exact centering of the nut 61 and of the bolt 7 is achieved.

Inasmuch as the recess 58 is of larger diameter than the recess 38 of the previous forms and all coupling housing segments 65 in accordance with the form of FIGS. 10 and 11 must be interchangeable with each other, a bolt with a slightly larger head than that of the previous forms will have to be used if the recess 58 is to act to center the bolt head also. As already pointed out, however, it is not so necessary that additional centering be provided for the bolt head, the oval bolt neck and the oval hole receiving it do this to a substantial extent.

From a consideration of the foregoing preferred and modified forms of the invention, it will be quite apparent that the invention eliminates one of the substantial deficiencies of the prior art constructions in full and effective manner. It is, of course, to be understood however that the showing in the accompanying drawing and the foregoing description are for illustrative and not limiting purposes, inasmuch as further modifications and variations of the invention could be made without departing from the spirit and scope thereof.

Having described my invention what I claim as new and desire to secure by Letters Patent is:

1. In coupling housing construction, a cylindrical housing formed of a plurality of segments of cylindrical sections, bolt pads extending directly outwardly from each of said segments one at each end thereof, each pad on one segment overlying a pad on the adjacent segment, said bolt pads being formed with bolt receiving walls extending transversely with respect to said segments, said walls being formed with oval holes therethrough centered with respect to said bolt pads and extending transversely thereof and each of said walls being formed with circular recesses extending thereinto from the surfaces thereof remote from the ends of said segments, said recesses being centered with respect to said holes and extending outwardly beyond the borders thereof, bolts passed through said bolt holes of said walls of each pair of overlying segments, each of said bolts having a head engaged with one wall of a pair thereof having an oval neck mated to the oval of the hole in said one wall and being seated therein, and said head overlying said neck, having a circular outline greater than the outline of said hole but smaller than the circle of said recess, said head being seated in said recess in said one one wall and being engaged with the bottom thereof and each of said bolts having a nut threadedly engaged with the end thereof opposite said head, said nut having a symmetrical portion thereof received within the recess in the other wall of said pair for centering said nut with respect to said recess whereby said bolt pad carrying said wall engaged by said nut is aligned with said bolt pad carrying said wall engaged by said head.

2. In coupling housing construction for clamp type couplings, a plurality of coupling segments forming together a complete cylinder, means extending outwardly from each of the segments adjacent the ends thereof, said outwardly extending means on the respective segments confronting each other and being adapted to receive a headed clamping bolt therethrough for the clamping of said segments together, each of said means including a wall extending outwardly from its respective segment, said wall being formed with an oval shaped opening therethrough for the passage of said bolt, each of said walls from the surface thereof remote from the respective segment being formed with a recess extending thereinto, said recesses surrounding said oval shaped openings, being centered with respect to the centers of the respective oval shaped openings, and each having a flat bottom and side wall formed substantially as a right circular cylinder, whereby a clamping bolt, extending through the confronting outwardly extending means on the coupling segments, having an oval shaped portion beneath its head for reception in one of said oval shaped openings, and having a head of a size for reception in the recess in the wall having said one opening therethrough, will be non-rotatably mounted in said segments and will be centered with respect to said recesses by means of said head on the bolt and by means of a nut on the bolt having a portion extending into and interfitting with the other of said recesses.

3. In coupling housing construction for clamp type couplings, a plurality of coupling segments forming together a complete cylinder, bolt pads extending outwardly from each of said segments at the ends thereof, each of said bolt pads being formed with an outwardly extending transverse wall, each of said walls being formed with an oval shaped hole extending therethrough transversely thereof, said holes being aligned when the segments are assembled to form said cylinder with pairs of bolt pads aligned and confronting each other, a clamping bolt having a cylindrical screw threaded shank extending through both of said holes, the shank of said bolt having a smaller diameter than the minor diameter of the oval of said holes, a circular recess formed into each of said walls on the outer side of each, away from the end of said segments, said recesses being centered with respect to said oval holes and extending outwardly with respect thereto, the bolt having a head, the head of the bolt overlying and engaging the wall on the outer side of one of two aligned bolt pads, said bolt having an oval portion beneath the head thereof mated to and received within the said oval hole in the said one of the two aligned bolt pads, a nut carried by said bolt, said nut overlying the oval hole in the other of said two aligned bolt pads and having a portion thereof extending into and interfitting with the said recess surrounding said last named oval hole whereby said last named recess will center said nut and the end of the bolt carrying the nut with respect to said other of said two aligned bolt pads.

4. Coupling housing construction as in claim 3, wherein the portion of said nut extending into the recess surrounding the hole in the other of said two aligned bolt pads is symmetrical about the center of the nut.

References Cited by the Examiner

UNITED STATES PATENTS

| 1,177,348 | 3/16 | Miller | 151—18 |
| 1,266,933 | 5/18 | Gardner | 24—135 |
| 1,959,741 | 5/34 | Simpson | 151—68 |
| 1,970,078 | 8/34 | Dillon | 285—367 |
| 2,295,051 | 9/42 | Roth | 24—125 |
| 2,439,979 | 4/48 | Kross | 285—419 |
| 2,713,352 | 7/55 | Schustack | 24—279 |
| 2,826,799 | 3/58 | Schustack | 24—279 |
| 2,874,439 | 2/59 | Jenne | 24—279 |
| 2,887,669 | 5/59 | Sylvester | 24—125 X |

DONLEY J. STOCKING, *Primary Examiner.*

BOBBY R. GAY, *Examiner.*